United States Patent [19]
Hahn et al.

[11] 4,422,721
[45] Dec. 27, 1983

[54] OPTICAL ARTICLE HAVING A CONDUCTIVE ANTI-REFLECTION COATING

[75] Inventors: Robert E. Hahn; Thomas R. Jones, both of Santa Rosa; Peter H. Berning, Sebastopol, all of Calif.

[73] Assignee: Optical Coating Laboratory, Inc., Santa Rosa, Calif.

[21] Appl. No.: 406,302

[22] Filed: Aug. 9, 1982

[51] Int. Cl.³ ............................................... G02B 1/10
[52] U.S. Cl. ................................................... 350/164
[58] Field of Search ................. 350/1.6, 164, 165, 166

[56] References Cited

U.S. PATENT DOCUMENTS 3,712,711 1/1973 Adachi ................................. 350/164
3,761,160 9/1973 Apfel et al. ......................... 350/164

*Primary Examiner*—Bruce Y. Arnold
*Assistant Examiner*—William Propp

*Attorney, Agent, or Firm*—Flehr, Hohbach, Test, Albritton & Herbert

[57] ABSTRACT

Optical article having a substrate with first and second surfaces and with a conductive antireflection coating disposed on the first surface. The conductive antireflection coating is comprised of at least one layer of a low index material carried by said first surface and a thin transparent conducting layer of a material having a high index of refraction carried by the layer of material having a low index of refraction. The conducting layer provides an exposed surface to which the direct electrical contact can be made. The conducting layer has an optical thickness ranging from 1.0 to 30.0 nanometers. The layer of material having a low index of refraction has its design thickness reduced to compensate for the thickness of the conducting layer whereby the conducting layer does not seriously degrade the optical performance of the coating over that which could be obtained without the use of the conducting layer.

9 Claims, 7 Drawing Figures

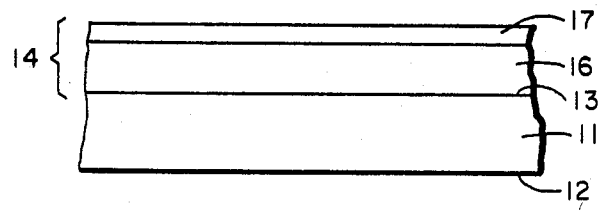
FIG.—1
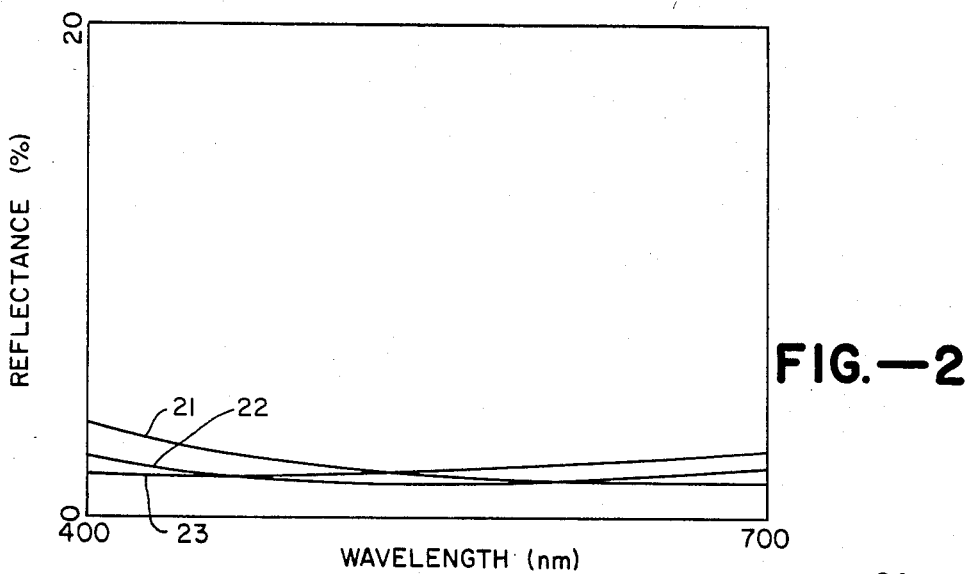
FIG.—2
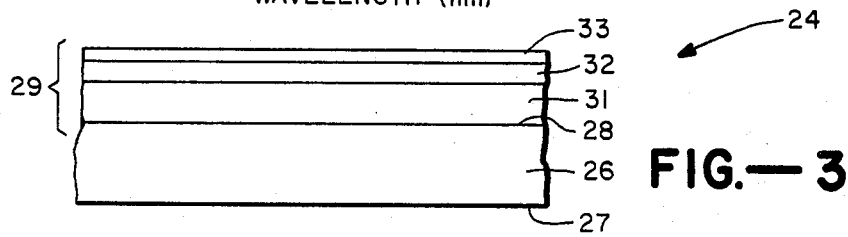
FIG.—3
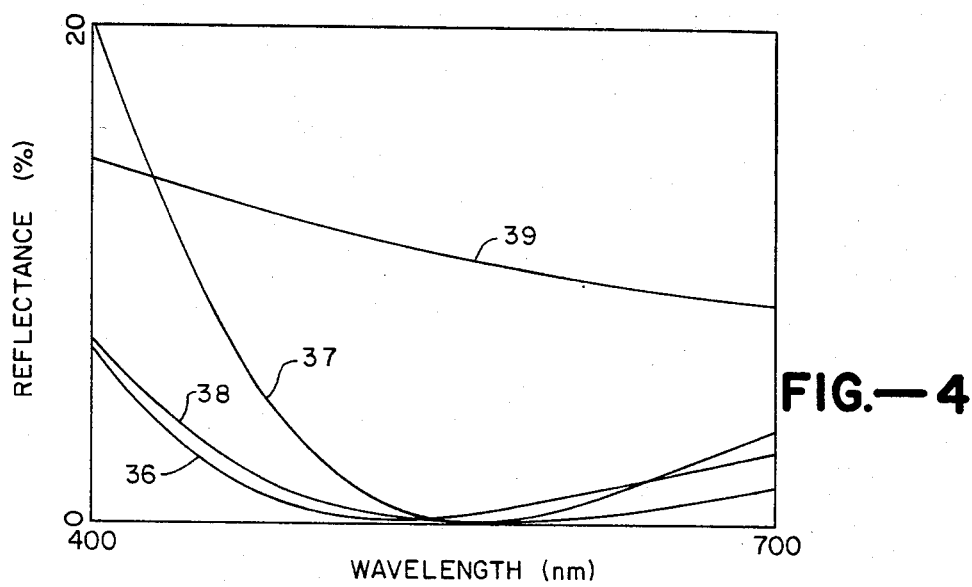
FIG.—4

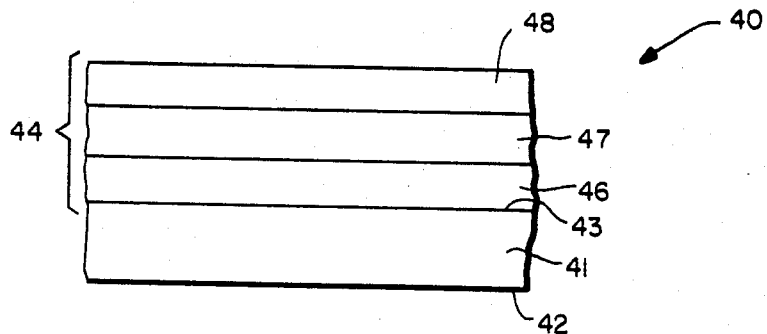
FIG.—5
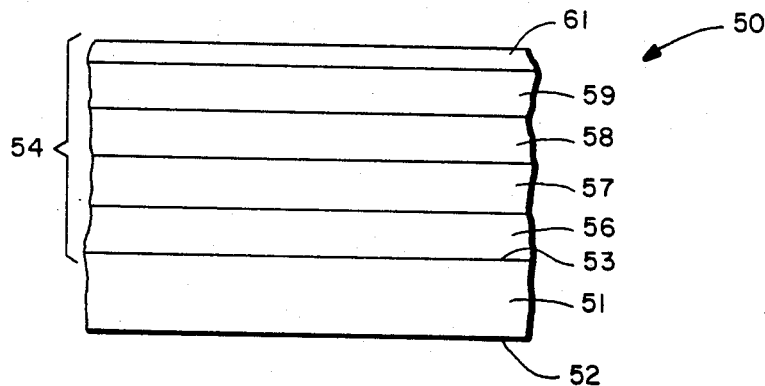
FIG.—6
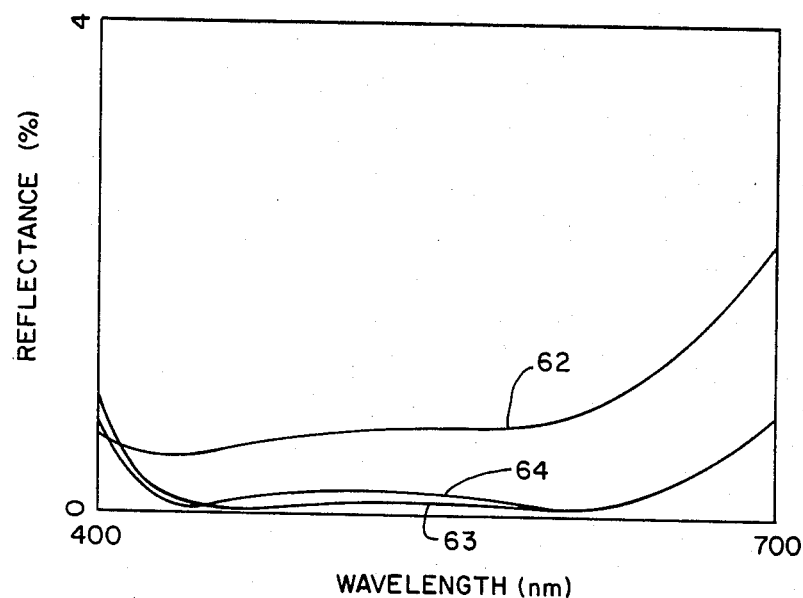
FIG.—7

OPTICAL ARTICLE HAVING A CONDUCTIVE ANTI-REFLECTION COATING

This invention relates to antireflection coatings and more particularly to conductive antireflection coatings.

Antireflection coatings have found widespread application throughout the field of optics and electro-optics where it is desirable or necessary to reduce the reflectance at any optical interface, as for example, air to glass. Application includes camera lenses, copier platens, cover glasses for instruments glare reduction coatings on panels for cathode ray tube and other display devices. Optical thin film coatings utilized for the various applications include single layer coatings, such as coatings formed of magnesium fluoride, two layer coatings characterized as V-coats to minimize reflectance at a single wavelength region, and multi-layer broad-band coatings such as those disclosed in U.S. Pat. No. 3,185,020 that produce low reflectance over a relatively broad wavelength region, as for example, the visible spectrum. Transparent conductive coatings have also found widespread applications within recent years or wherever electrical conductivity and high optical transparency are required. For such purposes films of indium tin oxide, cadmium stannate, tin antimony oxide and others have been utilized in various displays, as for example, liquid crystal displays, visually transmitting window heating elements for aircraft windows, static bleed coatings and heat retaining visible light transmitting coatings for lamp envelopes, etc. However, all presently known transparent conducting film materials have high indices of refraction with values typically in the range of 1.8 to 2.2. Use of such materials having high indices of refraction frequently leads to the undesirable effect that films of these materials deposited on glass substrates increase visual reflectance which often reduces device or system performance. Also, because of the high index of refraction of transparent conductive materials, the design of antireflection coatings with electrical conductivity has been seriously constrained. Presently available wide band anti-reflection coatings with electrical conductivity employ either a half wave layer or part of a modified quarter wave layer nearest the substrate of a conventional quarter wave-half wave-quarter wave design. Such designs have conductance values that are relatively high and relatively low respectively. The optical performance of such coatings is comparable to, but generally less efficient than, the non-conducting designs on which they are based. In addition, in order to use such conducting anti-reflection coatings it has been necessary to make electrical contact to the conducting layer by various methods such as by scratching through the non-conducting layer, using masks to prevent overcoating the conducting layer or by providing bus bars to provide the necessary physical contact to the conducting layer. Such contact structures add to the complexity and costs of the resulting product. There is therefore a need for a new and improved conducting antireflecting coating.

In general it is an object of the present invention to provide an optical article having a conductive antireflection coating thereon.

Another object of the invention is to provide a coating of the above character in which the layer adjacent to the incident medium (air) is a layer of high index conducting material which is readily accessible.

Another object of the invention is to provide a coating of the above character in which the various layers of the coating provide an optical performance which closely approximates that of their non-conducting counterparts.

Another object of the invention is to provide an optical article having a coating of the character described which has both optical antireflection properties and electrical conducting properties.

Another object of the invention is to provide an article having a coating thereon of the above character which has high transmission and low absorption.

Another object of the invention is to provide an article having a coating thereon of the above character which permits direct electrical contact to the conductive layer.

Additional objects and features of the invention will appear from the following description in which preferred embodiments are set forth in conjunction with the accompanying drawings.

FIG. 1 is a cross-sectional view of an optical article having a conductive antireflection coating thereon incorporating the present invention.

FIG. 2 is a graph showing the performance of the coating shown in FIG. 1.

FIG. 3 is a cross-sectional view of another optical article having a coating thereon incorporating another embodiment of the present invention.

FIG. 4 is a graph showing the performance of the coating shown in FIG. 2.

FIG. 5 is a cross-sectional view of another optical article having a coating thereon incorporating another embodiment of the present invention.

FIG. 6 is a cross-sectional view of still another optical article having a coating thereon incorporating another embodiment of the present invention.

FIG. 7 is a curve showing the performance of the coating shown in FIG. 6.

In FIG. 1, there is shown an optical article having a conductive antireflection coating thereon incorporating the present invention. As shown, the optical article 10 consists of a suitable transparent substrate such as glass having an index of refraction ranging from 1.5 to 2.0 and typically having an index of refraction of 1.52. The substrate 11 is provided with first and second optical surfaces 12 and 13. An antireflection coating 14 is carried by one of the surfaces 12 and 13 of the substrate 11 as, for example, surface 13 as shown in FIG. 1.

The conducting antireflection coating 14 consists of a layer 16 formed of a material having a low index of refraction ranging from 1.35 to 1.46 as, for example, magnesium fluoride having an index or refraction of 1.38. Typically, the layer of low index material would have an optical thickness for use in the visible region of approximately one-quarterwave for a design wavelength of approximately 550 nanometers. A thin transparent conducting layer 17 also forms a part of the coating 14 and overlies the layer of low index material. Because of the thickness of the thin transparent conducting layer 17, the thickness of the layer 16 is slightly less than the conventional quarterwave optical thickness for reasons hereinafter explained. The thin transparent conducting layer 17 would have a suitable thickness ranging from 1.0 to 10.0 nanometers with the preferred thickness ranging from 4.0 to 6.0 nanometers. Materials found to be suitable for the thin transparent conducting layer have been indium tin oxide, cadmium stannate and antimony oxide. The magnesium fluoride layer can be deposited in a conventional manner well known to those skilled in the art. The materials for making the thin transparent conducting layer also can be applied in a conventional manner. For example, the indium and tin metals can be placed in boats and evaporated in an oxygen atmosphere in a conventional coating chamber to condense on the substrate. Sputtering and chemical vapor deposition can also be utilized to apply these materials.

The design concept which is utilized in connection with the design of the conductive anti-reflection coating 14 is based on the premise that if a thin layer of non-absorbing material whose optical thickness is a small fraction of a wavelength is added to the design, relatively small changes will occur in the optical performance of the anti-reflection coating. In addition, it has been found that if the optical thickness of the outermost layer of the initial design for the antireflection coating is reduced by approximately the optical thickness of the added conducting layer, the resulting changes in optical performance are minimized.

The optical coating which is shown in FIG. 1 can be characterized as a single layer antireflection coating which typically is made by using a film of quarterwave optical thickness as hereinbefore described and having indices that are as close as possible to the value $$N_f = \sqrt{N_o \times N_s}$$

where $N_f$, $N_o$ and $N_s$ are the refractive indices of the film, the incident medium and the substrate respectively. The most common example of this type of antireflection film is a quarterwave layer of magnesium fluoride on a glass substrate as shown in FIG. 1. This single-layer coating has been modified, as shown in FIG. 1, to produce a conducting antireflection coating by adding a thin transparent conducting layer 17 described previously in connection with FIG. 1.

The spectral performance which can be obtained from use of a conducting antireflection coating 14 as shown in FIG. 1 is shown in FIG. 2. In the coatings providing the curves in FIG. 2, there have been added 4.5 nanometers of conducting material to quarterwave layers at 550 nanometers (curve 21), 440 nanometers (curve 22) and 330 nanometers (curve 23). As can be seen from FIG. 2, the addition of a thin layer of conducting material shifts the spectral curve to slightly longer wavelengths but retains low reflectance comparable to a single layer of magnesium fluoride. In a nearly equivalent manner the magnesium fluoride layer can be reduced slightly in thickness to keep the reflectance minimum at the initial location. In any event, the addition of a thin conducting layer is the key to retaining the essential characteristics of the single-layer antireflection coating. It has been found that it would be unacceptable to place the thin transparent conducting layer over a magnesium fluoride coating of conventional thickness because this would shift the performance of the coating upscale so that it would no longer be centered well in the visible region and therefore it would not have the appropriate antireflective properties. In order to shift the performance of the coating downscale in order to provide a good visual appearance, it is necessary to decrease the optical thickness of the magnesium fluoride layer to make up for the addition of the optical thickness of the thin transparent conducting layer. It has been found that the minimum antireflectance curve tends to be determined by the combined optical thickness of both the magnesium fluoride layer and the thin transparent conducting layer. Therefore in order to keep the combined optical thickness substantially constant it is necessary to reduce the thickness of the magnesium fluoride layer to compensate for the optical thickness of the thin transparent conducting layer.

In FIG. 2, the conducting coating 14 providing the curve 21, the thin transparent conducting layer 17 had a physical thickness of 4.5000 nanometers and a quarterwave optical thickness of 36.00 nanometers and the magnesium fluoride layer 16 had a physical thickness of 99.6377 nanometers and a quarter wave optical thickness of 550.000 nanometers. The total physical thickness of the coating 14 was 104.138 nanometers (0.00410 mils). The optical coating 14 providing the curve 22 had a physical thickness of 4.5000 nanometers and a 36.000 nanometer quarterwave optical thickness for the thin transparent conducting layer 17 and a physical thickness of 79.7101 and a quarterwave optical thickness of 440.000 nanometers for the magnesium fluoride layer 16 to provide a total physical coating thickness of 84.210 nanometers (0.00332 mils). The optical coating 14 providing the curve 23 had a physical thickness of 4.500 nanometers and a 36.000 nanometer quarterwave optical thickness for the thin transparent conducting layer 17 and a physical thickness of 59.7826 and a quarterwave optical thickness of 330.000 nanometers for the magnesium fluoride layer 16 with a total physical thickness for the optical coating 14 being 64.283 nanometers (0.00253 mils).

From the foregoing, it can be seen that the thin transparent conducting layer 17 had the same thickness in each of the three designs shown in FIG. 2 and that the magnesium fluoride layer thickness was varied. These three curves show that for a well-balanced design, it is desirable to have a thickness of magnesium fluoride corresponding to curve 22 so that the antireflection coating is centered in the visible region for optimal performance.

It has been found that the appropriate design technique is to select the thickness of the thin transparent conducting layer and thereafter to redesign the magnesium fluoride layer to compensate for the thickness of the thin transparent conducting layer. The thickness of the thin transparent conducting layer 17 typically is selected on the basis of the sheet resistivity desired. As for example, in platen applications where it is desired to bleed off any static charge, a sheet resistivity of less than $10^{10}$ ohms/square is desirable. In addition in selecting the thickness for the thin transparent conducting layer 17, it is necessary to also consider the durability, electrical stability, overall performance, and repeatability of making the coating. Therefore the ultimate objective is to increase the thickness of the thin transparent conducting layer to a sufficient amount without substantially degrading the optical properties desired for the antireflection coating. As can be appreciated, the tradeoff is between providing increased sheet conductivity against ultimately what will become unacceptable overall optical performance. With such constraints, it is possible to provide a thin transparent conducting layer having a sheet resistivity as low as 300 ohms per square.

In FIG. 3, there is shown an optical article having an antireflection coating incorporating another embodiment of the invention which the reflectance at a single or very narrow wavelength region can be made to approach zero reflectance. The optical article 24 shown in FIG. 3 consists of a substrate 26 formed of a suitable material such as glass having the same characteristics as the substrate 11 for the embodiment shown in FIG. 1. It is also provided with optical surfaces 27 and 28. An antireflection coating 29 is disposed on the surface 28 and consists of a plurality of layers including layers 31, 32 and 33. Layer 31 which can be either conducting or nonconducting is disposed on the surface 28. For example, it can be formed of a transparent conducting material such as indium tin oxide having a high index of refraction of 2.00 and an optical thickness of approximately 20 nanometers. A layer 32 is disposed on the layer 31 and is formed of a low index material such as magnesium fluoride having an index of refraction of 1.38. A thin transparent conducting layer 33 is disposed on the layer 32 and is formed of a suitable material such as indium tin oxide having a high index refraction of 2.000. The magnesium fluoride layer can typically have a thickness of approximately 110 nanometers whereas the thin conducting layer can have a thickness ranging from 1.0 to 10.0 nanometers depending upon the desired characteristics.

The embodiment shown in FIG. 1 is basically a single layer antireflection coating whereas the embodiment shown in FIG. 3 is basically a two layer antireflection coating. The graph shown in FIG. 4 shows the performance characteristics for the two-layer design of the type described in FIG. 3. Curves 36, 37, 38 and 39 are shown in FIG. 4. Curve 36 was formed by a conducting antireflection coating 29 by forming the layer 31 of indium tin oxide having an index of refraction of 2.000 with a physical thickness of 28.4375 nanometers and a quarterwave optical thickness of 227.5 nanometers, by forming the low index layer 32 of magnesium fluoride with a physical thickness of 111.8659 nanometers and a quarterwave optical thickness of 617.5 nanometers and by forming the layer 33 of indium tin oxide having an index of refraction of 2.000 and having a physical thickness of 1.2187 nanometers and a quarter wave optical thickness of 9.75 nanometers to provide a total physical thickness for the coating 29 of 141.522 nanometers (0.00557 mils). This design has typically been called a V-coat which has been modified to include a conductive outer layer.

The curve 37 was provided by a conductive antireflection coating 29 in which the layer 31 was also formed of indium tin oxide having a physical thickness of 48.1250 nanometers and a quarterwave optical thickness of 385.00 nanometers with the layer 32 being formed of magnesium fluoride having a physical thickness of 62.2735 nanometers with a quarterwave optical thickness of 343.75 nanometers and with the outer layer 33 being formed of indium tin oxide having a physical thickness of 22.343 nanometers and a quarterwave optical thickness of 178.75 nanometers to provide a coating of a total physical thickness of 132.742 nanometers (0.00523 mils). This coating 29 can be characterized as a two layer V-coat antireflection coating with a thicker outer transparent conducting layer.

Curve 38 was produced by a coating 29 having a layer 31 of indium tin oxide having a physical thickness of 20.6250 nanometers and a quarterwave optical thickness of 165.00 nanometers and with the layer 32 formed of magnesium fluoride having a physical thickness of 129.5290 nanometers and a quarterwave optical thickness of 715.00 nanometers with the layer 33 being omitted and with the coating 29 having a total physical thickness of 150.15 nanometers (0.00591 mils). This coating 29 shown in curve 38 can be characterized as a V-coat comparable to the V-coat producing curve 36 without the outer indium tin oxide layer as an overcoat.

A comparison of the curves 36 and 38 show the difference in performance of the V-coat with and without a thin conductive layer on the outer surface. Curves 36 and 37 show that there is a negligible degradation of performance in the region of the reflectance minimum by adding the conductive coating to the outer surface.

Curve 36 shows the optical performance using the previously described design principles utilized in connection with the embodiment of the invention shown in FIG. 1 but utilizing the additional layer between the magnesium fluoride layer and the substrate and shows that the very thin conducting layer on the outer surface does not appreciably degrade the performance of the antireflection coating and provides near zero reflectance of a portion of the visible region. Curve 37 shows that even when a thicker outer layer of conducting material is provided a substantially zero reflectance is still obtained although the reflectance is reduced over only a narrower wavelength region. However, the conducting layer is adjacent to the incident medium and is available for direct electrical contact. In addition, its reasonable optical thickness results in a reasonably low value of electrical resistance, i.e., less than 1000 ohms per square.

Curve 39 shown in FIG. 4 is a curve which is produced by a coating of indium tin oxide only with a thickness of approximately 250 Angstroms. This curve demonstrates that such a coating is very reflective and is not very useful for critical applications where low reflectance is required.

Another embodiment of an optical article having a conducting antireflection coating incorporating the present invention is shown in FIG. 5 which is similar to the design shown in FIG. 3 but which has been modified to make possible the use of thicker outer transparent conducting layers. As shown in FIG. 5, this optical article 40 consists of a substrate 41 of the type hereinbefore described in connection with the previous embodiments having optical surfaces 42 and 43 and a conductive antireflection coating 44 disposed thereon. Coating 44 consists of a layer 46 which typically can be a transparent conducting layer followed by a layer 47 of a low index material such as magnesium fluoride followed by a thicker transparent conducting layer 48 formed of a high index material such as indium tin oxide and having a thickness of 15.0 to 30.0 nanometers with a preferred thickness of 20.0 to 25.0 nanometers. The transparent conducting layer 46 typically can have a physical thickness ranging from 25 to 60 nanometers with a preferred physical thickness of 40 to 50 nanometers. The magnesium fluoride layer 47 can have a thickness ranging from 40 to 80 nanometers with a preferred physical thickness of 55 to 70 nanometers. With such a thicker outer transparent conducting layer it has been found it is possible to obtain sheet resistances which are well below 1000 ohms per square. Such highly conductive coatings find applications in cathode ray tube displays where some moderate amount of radio frequency interference (RFI) shielding is required.

Another optical article 50 having a conductive antireflection coating thereon incorporating the present invention is shown in FIG. 6 and consists of a substrate 51 of the type hereinbefore described with the previous embodiments having optical surfaces 52 and 53 with a conducting antireflection coating 54 disposed on the surface 53. The coating 54 can be characterized as a conventional HEA coating such as the type described in U.S. Pat. Nos. 3,185,020 and 3,432,225 which has been modified by the addition of a thin transparent conducting layer. Thus the coating 54 is comprised of a layer 56 formed of a high index material having an index of refraction of approximately 2.0 to 2.1 and having a quarterwave optical thickness at 115 to 130 nanometers. It is also comprised of a layer 57 of a low index material such as magnesium fluoride having a quarterwave optical thickness at 160 to 170 nanometers and another layer 58 formed of a high index material having an index of refraction of 2.0 to 2.1 and having approximately a quarterwave optical thickness at 1070 nanometers followed by another layer 59 formed of a material having a low index refraction such as magnesium fluoride and having an approximate quarterwave optical thickness of 425 nanometers in the visible region. The layers 56 through 59 are designed in accordance with the teaching of U.S. Pat. Nos. 3,185,020 and 3,432,225.

The coating 54 is also comprised of the layer 61 formed of a thin transparent conducting material such as indium tin oxide having a thickness ranging from 1.0 to 10.0 nanometers and having a thickness of preferably approximately 4.5 nanometers. In this embodiment of the invention it can be seen that a conventional HEA coating has been modified with the addition of an approximately 5.0 nanometer thick layer of indium tin oxide as the outer layer with an adjustment in the thickness of the magnesium fluoride layer to compensate for the indium tin oxide layer so as to maintain achromatic low reflectivity in the visible spectrum. In order to obtain this compensation, the thickness of the magnesium fluoride has been reduced from the quarterwave optical thickness of 500 nanometers to approximately 425 nanometers.

In FIG. 7 curves 62, 63 and 64 are shown demonstrating the performance of a coating of the type shown in FIG. 4. Curve 63 illustrates the calculated reflectance of a conventional HEA broadband antireflection coating. Curve 62 illustrates the same coating with the outer magnesium fluoride layer 59 being approximately 15 percent thinner. By the addition of a thin layer of indium tin oxide as an outer layer 61 having a physical thickness of approximately 4.5 nanometers the optical performance which is shown by curve 64 is obtained. It can be seen this provides a conducting HEA coating whose optical performance is substantially similar to that of the nonconducting HEA coating and permits direct contact to the outer conducting layer. Increases in the thickness of the conducting layer 61 leading to concomitant decreases in the thickness of the magnesium fluoride layer 59 leads to progressive deterioration of the spectral performance of the coating until the performance becomes unacceptable.

It should be appreciated that the design approach hereinbefore described in conjunction with FIG. 6 can be utilized with designs that utilize a conducting layer for the halfwave layer 58. Modification of the outer magnesium fluoride layer to accommodate an additional thin conducting layer yields a broadband antireflection coating permitting direct contact to one of the conducting layers while still having a high overall reflectance. Such coatings are useful for RFI shielding applications.

From the foregoing it can be seen that the relatively thin conducting layers provided in each of the designs give sheet resistance levels that can be adjusted from nearly infinite values to values of several thousand ohms per square. The designs employing a thick halfwave layer of the narrow band modified two-layer coating hereinbefore described have thicker conducting layers and again can have sheet resistance values below 100 ohms per square. However in all cases, increased conductance leads to a tradeoff with the optical performance. The principle discovery in connection with the present invention is that a certain portion of the outermost magnesium fluoride layer can be replaced by a high index layer with conducting properties without significant loss in reflection performance provided: (1) the high index layer thickness has been confined to a suitable low range of values and (2) the thickness of the outer magnesium fluoride layer is appropriately reduced.

In general, use of the thin transparent conducting coatings used in anti-static applications have suffered a maximum reflectance increase of only about 0.1 percent whereas the integrated reflectance increase is substantially less than this value. Moreover, the effective bandwidth is actually slightly increased over that which is obtained with a conventional coating without the thin transparent conducting layer. Whereas, as pointed out earlier, failure to properly adjust the outer magnesium fluoride layer thickness downwardly results in a spectral curve with a definite tilt-up at shorter wavelength and a subsequent loss of achromatic behavior.

The lower limit of the thin conducting layer thickness is dictated by questions of adequate conductivity and stability of the same. The upper limit thickness is set by what is deemed acceptable in terms of increased reflectance. Reasonably achromatic coating performance can be maintained with the use of still thicker layers of the material utilized for forming the thin transparent conducting layer to a certain point at which time reflectance levels will begin to rise considerably. In order to completely optimize the design common in certain applications, it is necessary to make some concurring adjustments in all of the layers in the design and not necessarily just to the upper or outer magnesium fluoride layer.

What is claimed is:

1. In an optical article, a substrate having first and second surfaces and a conductive antireflection coating disposed on the first surface, said conductive antireflection coating having at least one layer of a low index material carried by said first surface and a thin transparent conducting layer of the material having a high index of refraction carried by said layer of low index material and providing an exposed surface to which a direct electrical contact can be made, said thin transparent conducting layer having an optical thickness ranging from 1.0 to 30.0 nanometers and wherein said layer of low index material has its design thickness reduced to compensate for the thickness of the thin transparent conducting layer whereby the provision of the thin conducting layer does not seriously degrade the optical performance of the coating over that which could be obtained without the use of the thin transparent conducting layer.

2. An article as in claim 1 wherein said conducting layer has a thickness ranging from 1.0 to 10.0 nanometers.

3. An article as in claim 1 wherein said thin conducting layer has a thickness ranging from 4.0 to 6.0 nanometers.

4. An article as in claim 1 wherein said thin conducting layer has a thickness ranging from 20.0 to 25.0 nanometers.

5. An article as in claim 1 wherein the coating includes an additional layer of a material having a high index of refraction disposed between the first surface of the substrate and the layer formed of a material having a low index material.

6. An article as in claim 5 wherein said additional layer is formed of a transparent conducting material.

7. An article as in claim 1 wherein said material forming the thin transparent conducting layer is selected from the materials of indium tin oxide, cadmium stannate and tin antimony oxide.

8. An article as in claim 7 wherein said layer formed of a material having a low index of refraction is formed of magnesium fluoride and wherein said thin transparent conducting layer is formed of indium tin oxide.

9. An article as in claim 1 wherein said coating includes at least two layers formed of a material having a low index of refraction and at least two layers formed of a material having a high index of refraction.

* * * * *